J. M. E. FRANC.
LUBRICATING DEVICE FOR LEAF SPRINGS.
APPLICATION FILED FEB. 24, 1919.
1,350,217. Patented Aug. 17, 1920.
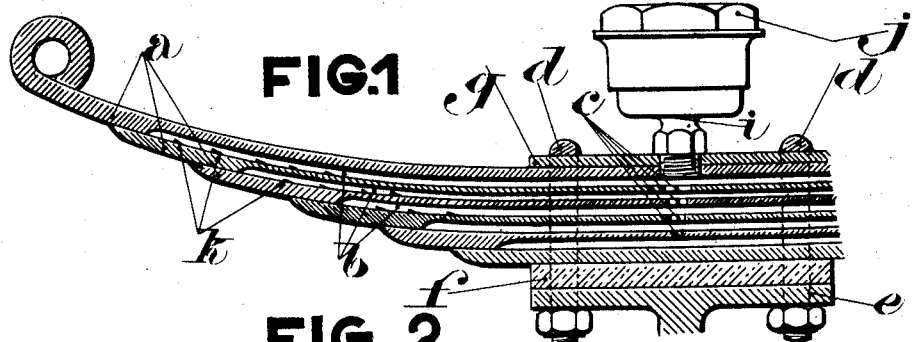
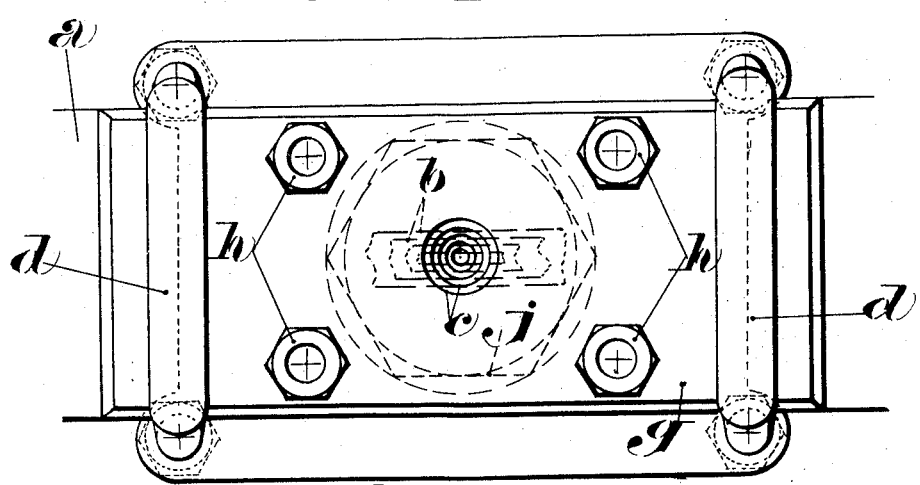
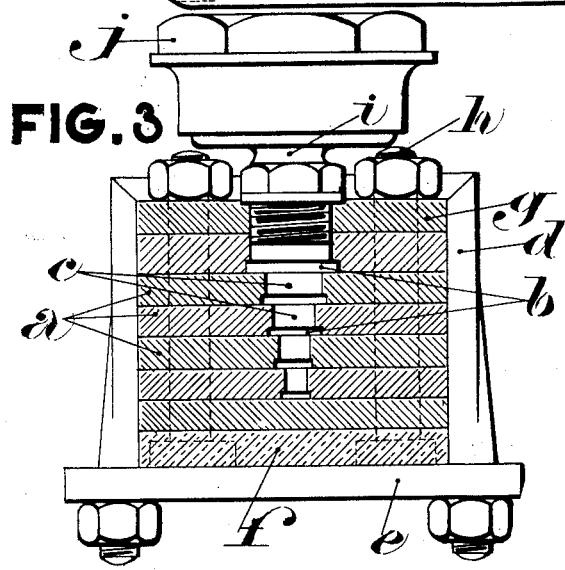

UNITED STATES PATENT OFFICE.

JOSEPH MARIE ETIENNE FRANC, OF ST. VALLIER, FRANCE.

LUBRICATING DEVICE FOR LEAF-SPRINGS.

1,350,217. Specification of Letters Patent. Patented Aug. 17, 1920.

Application filed February 24, 1919. Serial No. 278,969.

*To all whom it may concern:*

Be it known that I, JOSEPH MARIE ETIENNE FRANC, a citizen of the French Republic, of St. Vallier, Drome, France, have invented a certain new and useful Lubricating Device for Leaf-Springs, of which the following is a specification.

The present invention has for its object a lubricating device for the leaf-springs of vehicles of all kinds, such as motor cars, wagons, trams, etc.

The device is illustrated in the accompanying drawing.

Figure 1 is a longitudinal section of a part of a leaf-spring.

Fig. 2 is a plan on a larger scale, the grease cap being removed.

Fig. 3 is a cross section of Fig. 2 with the grease cap in place.

According to the invention the leaves $a$ of the spring are provided in their middle part and on their lower surface with longitudinal grooves $b$ extending over nearly the whole length of the surface in contact with the surface of the leaf situated underneath. The bottom leaf has no groove.

These grooves are of gradually decreasing width, from the main leaf to the last lower leaf but one, and are in communication with each other by openings $c$ provided in the middle of the leaves.

The mounting of the leaves is effected as usual by means of coupling plates $d$ pressing them on the support $e$ of the axle. In the drawing a wooden or fibrous wedge is shown at $f$ arranged between said support and the bottom leaf of the spring.

In the same way, between the upper leaf and the coupling plates is interposed a block $g$ intended to prevent breaking of the spring. Four bolts $h$ (Figs. 2 and 3) pass through the said block and through all the leaves and, having their heads sunk in the wedge $f$, complete the mounting of the spring.

In the center of the block $g$ is fixed a lubricator cup $l$ having a large outlet orifice and a screw-stopper $j$, so that consistent or graphite lubricant or even thick oil can pass through the successive springs $c$ into the grooves of the leaves. The stopper $j$ of said lubricator is hexagonal in shape so that by means of a spanner, strong pressure can be exerted on the lubricant and the latter sent into the grooves as far as the ends of the leaves to lubricate the latter.

To facilitate the progress of the lubricant especially along the upper leaves, teeth $k$ (Fig. 1) are provided on each leaf, opposite the groove situated above. In consequence of the flexions of the leaves, a natural progress of the lubricant is produced which, in conjunction with the impulsion produced by the lubricator, enables it to reach more easily the ends of the leaves without dispersing and leaking at the sides. These teeth $k$ are, however, only necessary for great lengths of springs and then only at the parts where the leaves are flexed. For this reason they are only provided in the upper leaves and at the ends of the same.

The grooves are not all of the same size; they are in proportion to the length of the leaves; of reduced section for the bottom leaves, which are short and do not bend much. Their size is increased in proportion to the increased length of the leaves up to the maximum in the top leaf, which is the longest, and the flexions of which have the maximum amplitude. In all cases, the lubrication can be assisted by means of notches in the grooves to insure a proper distribution of the lubricant.

In case the spring, instead of being supported on is suspended from the bridge or the axle, the construction as above described is provided, except that all the holes $c$ have a diameter at least equal to the diameter of the opening of the lubricator, the latter being then arranged underneath head downward.

What I claim as my invention and desire to secure by Letters Patent of the United States is:—

1. In a device of the character described, a leaf-spring composed of a plurality of leaves of successively decreasing length having longitudinal grooves along their surfaces in contact, said grooves communicating with one another by orifices formed in the leaves and being of successively decreasing width from leaf to leaf, and means for supplying lubricant to said grooves.

2. In a device of the character described, a leaf-spring composed of a plurality of leaves having longitudinal grooves along their surfaces in contact said grooves communicating with one another by orifices formed in the leaves, a lubricant cup in communication with said orifices, and teeth upon said leaves projecting into the groove of the adjacent leaf.

In witness whereof I have signed this specification in the presence of two witnesses.

JOSEPH MARIE ETIENNE FRANC.

Witnesses:
JEAN GERMAIN,
MARIN VACHON.